US012577811B2

(12) United States Patent
Romero

(10) Patent No.: US 12,577,811 B2
(45) Date of Patent: Mar. 17, 2026

(54) ELECTRONIC LOCK ASSEMBLY AND METHOD OF INSTALLING THE SAME

(71) Applicant: ASSA ABLOY Americas Residential Inc., New Haven, CT (US)

(72) Inventor: Oscar Romero, Laguna Woods, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 79 days.

(21) Appl. No.: 18/685,341

(22) PCT Filed: Aug. 31, 2022

(86) PCT No.: PCT/US2022/042150
§ 371 (c)(1),
(2) Date: Feb. 21, 2024

(87) PCT Pub. No.: WO2023/038833
PCT Pub. Date: Mar. 16, 2023

(65) Prior Publication Data
US 2024/0352769 A1 Oct. 24, 2024

Related U.S. Application Data

(60) Provisional application No. 63/261,041, filed on Sep. 9, 2021.

(51) Int. Cl.
*E05B 63/00* (2006.01)
*E05B 9/08* (2006.01)
*E05B 47/00* (2006.01)

(52) U.S. Cl.
CPC ............ *E05B 63/0017* (2013.01); *E05B 9/08* (2013.01); *E05B 47/0012* (2013.01);
(Continued)

(58) Field of Classification Search
CPC ........... E05B 47/026; E05B 2047/0048; E05B 2047/005; E05B 2047/0057;
(Continued)

(56) References Cited

U.S. PATENT DOCUMENTS 4,701,133 A * 10/1987 Worth .................... H01R 24/84 439/292
5,246,377 A * 9/1993 Kawahara ............ H01R 35/025 439/15
(Continued)

FOREIGN PATENT DOCUMENTS

JP 2018-071224 5/2018

OTHER PUBLICATIONS

Screen captures from YouTube video clip entitled "How To Install your Schlage Connect™ Smart Deadbolt," 4 pages, uploaded on Nov. 7, 2018 by user "SchlageLocks". Retrieved from Internet: <https://www.youtube.com/watch?v=MSG2yPSAB40> (Year: 2018).*
(Continued)

*Primary Examiner* — Christine M Mills
*Assistant Examiner* — Peter H Watson
(74) *Attorney, Agent, or Firm* — Merchant & Gould P.C.

(57) ABSTRACT

An electronic lock assembly includes a latch assembly with a bolt along a first axis and a drive shaft extending along a second axis. The drive shaft selectively rotatable around the second axis to drive the movement of the bolt. A first assembly includes a wiring harness having a first connector extending therefrom. A second assembly is coupled to the drive shaft and includes a second connector configured to receive the first connector. The second assembly includes a housing having a surface configured to face a door when the housing is mounted to the door and a recess is defined within the surface. A connector holder clip is pivotably supporting the second connector and disposed at least partially within
(Continued)

the recess. The second connector being movable between at least a first position whereby the second connector is parallel to the second axis and a different second position.

19 Claims, 9 Drawing Sheets

(52) U.S. Cl.
CPC . *E05B 2047/0017* (2013.01); *E05B 2047/002* (2013.01); *E05B 2047/0048* (2013.01); *E05B 2047/0084* (2013.01)

(58) Field of Classification Search
CPC ..... E05B 2047/0084; E05B 2047/0085; E05B 2047/0086; E05B 2047/0091; E05B 2047/0094; E05B 2047/0095; E05B 9/08; E05B 9/082; H01R 35/04; H01R 13/426
USPC ............................................................ 439/13
See application file for complete search history.

(56) References Cited

U.S. PATENT DOCUMENTS

| | | | | |
|---|---|---|---|---|
| 2003/0132829 | A1 | 7/2003 | Frolov et al. | |
| 2007/0204665 | A1 | 9/2007 | Lie-Nielsen et al. | |
| 2011/0252843 | A1 | 10/2011 | Sumcad et al. | |
| 2012/0021614 | A1 * | 1/2012 | Chen | H01R 12/716 439/13 |
| 2014/0250956 | A1 | 9/2014 | Chong | |
| 2016/0145898 | A1 * | 5/2016 | Ohl | E05B 47/0001 70/101 |

OTHER PUBLICATIONS

PCT International Search Report and Written Opinion in Application PCT/US2022/042150, mailed Dec. 22, 2022, 8 pages.
PCT International Preliminary Report on Patentability in Application PCT/US2022/042150, mailed Mar. 21, 2024, 7 pages.

* cited by examiner

ELECTRONIC LOCK ASSEMBLY AND METHOD OF INSTALLING THE SAME

CROSS-REFERENCE TO RELATED APPLICATIONS

This application is a National Stage Application of PCT/US2022/042150, filed on Aug. 31, 2022, which claims the benefit of U.S. Provisional Patent Application No. 63/261,041, filed Sep. 9, 2021, the entire disclosures of which are incorporated herein by reference in their entireties. To the extent appropriate, a claim of priority is made to each of the above disclosed applications.

BACKGROUND

Electronic locks may be utilized for securing access in both residential and commercial settings. Installation of electronic locks typically require a wiring harness of an exterior assembly to be passed through a bore in a door for physical connection to an interior assembly with connectors. Once the exterior assembly and the interior assembly are connected to each other, the wire assembly connecting the two becomes long and stiff, thereby being difficult to bend and tuck within a recess provided within the interior assembly. Therefore, there is a need for improvements in the physical connection between the exterior and interior assemblies and the corresponding installation techniques.

SUMMARY

This disclosure relates generally to electronic locks and methods of installing the same. According to one aspect of the present disclosure, a pivoting connector holder clip is provided at an interior assembly so that the exterior assembly is more easily connected to the interior assembly and wires extending therebetween are more easily tucked into the interior assembly.

In an aspect, the technology relates to an electronic lock assembly including: a latch assembly with a bolt movable between an extended position and a retracted position along a first axis; a drive shaft extending along a second axis and coupled to the latch assembly, the drive shaft selectively rotatable around the second axis to drive the movement of the bolt, wherein the first axis is orthogonal to the second axis; a first assembly including a wiring harness having a first connector extending therefrom; and a second assembly coupled to the drive shaft and including a second connector configured to receive the first connector such that the first assembly and the second assembly are coupled in communication, the second assembly including: a housing having a surface configured to face a door when the housing is mounted to the door, wherein a recess is defined within the surface; and a connector holder clip pivotably supporting the second connector and disposed at least partially within the recess, the second connector being movable between at least a first position whereby the second connector is parallel to the second axis and a different second position.

In an example, the second position is about 90° from the first position. In another example, the second assembly further includes a gearbox housing, the connector pivotably coupled to the gearbox housing. In still another example, the connector holder clip pivots around a third axis, the third axis being different than both of the first axis and the second axis. In yet another example, the third axis is parallel to a plane defined by the surface of the housing. In an example, the housing has a bottom wall, and the third axis intersects the bottom wall at an oblique angle.

In another example, when the second connector is in the second position and the wiring harness is coupled thereto, the wiring harness extends at least 180° around the drive shaft within the recess. In still another example, the connector holder clip includes a base member coupled within the recess and a clip member for the second connector pivotably coupled to the base member. In yet another example, the connector holder clip has a substantially U-shaped body with a slit at one end.

In another aspect, the technology relates to an interior assembly for an electronic lock assembly including: a housing having a surface configured to face a door when the housing is mounted to the door, wherein a recess is defined within the surface; a gearbox housing disposed at least partially within the housing; a shaft at least partially extending from the gearbox housing and defining a first axis, the shaft drivingly coupled to the gearbox housing such that the shaft is selectively rotatable around the first axis; at least one printed circuit board disposed within the housing, wherein an interior connector is coupled in communication with the at least one printed circuit board and configured to receive an exterior connector extending from an exterior assembly of the electronic lock assembly; and a connector holder clip disposed at least partially within the recess and pivotably supporting the interior connector, wherein the connector holder clip is pivotable around a second axis, the second axis being parallel to a plane defined by the surface of the housing and orthogonal to the first axis.

In an example, one or more wires extend between the at least one printed circuit board and the interior connector, and the interior connector via the connector holder clip is pivotable around the second axis between at least two positions. In another example, a first position of the interior connector extends at least a portion of the interior connector out of the recess and a second position of the interior connector retracts the interior connector within the recess. In still another example, the connector holder clip defines a through opening to receive the interior connector with the one or more wires extending from one end. In yet another example, the connector holder clip is pivotably coupled to the gearbox housing via a pair of pivot pins. In an example, the gearbox housing defines a pair of pivot pin receivers.

In another example, the housing includes a back plate that secures the connector holder clip to the gearbox housing. In still another example, the connector holder clip is raised relative to a bottom wall of the recess. In yet another example, the connector holder clip is pivotable around the second axis at least 90°.

In another aspect, the technology relates to a method of installing an electronic lock assembly on a door, the method including: mounting an exterior assembly on an exterior surface of the door, wherein a wiring harness having an exterior connector extends from the exterior assembly and extends through a bore on the door; attaching a mounting plate to an interior surface of the door opposite at least a portion of the exterior assembly; extending at least a portion of the wiring harness through the mounting plate; connecting the exterior connector to a corresponding interior connector accessible from a rear of an interior assembly, wherein the interior connector is pivotably supported by a connector holder clip and is in a first position relative to the interior assembly; pivoting the connector assembly to a different second position within the interior assembly such that at least a portion of the wiring harness is tucked within a recess defined in the rear of the interior assembly; and mounting the interior assembly to the mounting plate.

In an example, the first position of the connector holder clip orients the interior connector orthogonal to the rear of the interior assembly for receipt of the exterior connector, and the second position of the connector holder clip orients the interior connector parallel to the rear of the interior assembly.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the examples disclosed herein are based.

BRIEF DESCRIPTION OF THE DRAWINGS

The following drawings are illustrative of particular examples of the present disclosure and therefore do not limit the scope of the present disclosure. The drawings are not to scale and are intended for use in conjunction with the explanations in the following detailed description. Examples of the present disclosure will hereinafter be described in conjunction with the appended drawings, wherein like numerals denote like elements.

DETAILED DESCRIPTION

Figure 1:
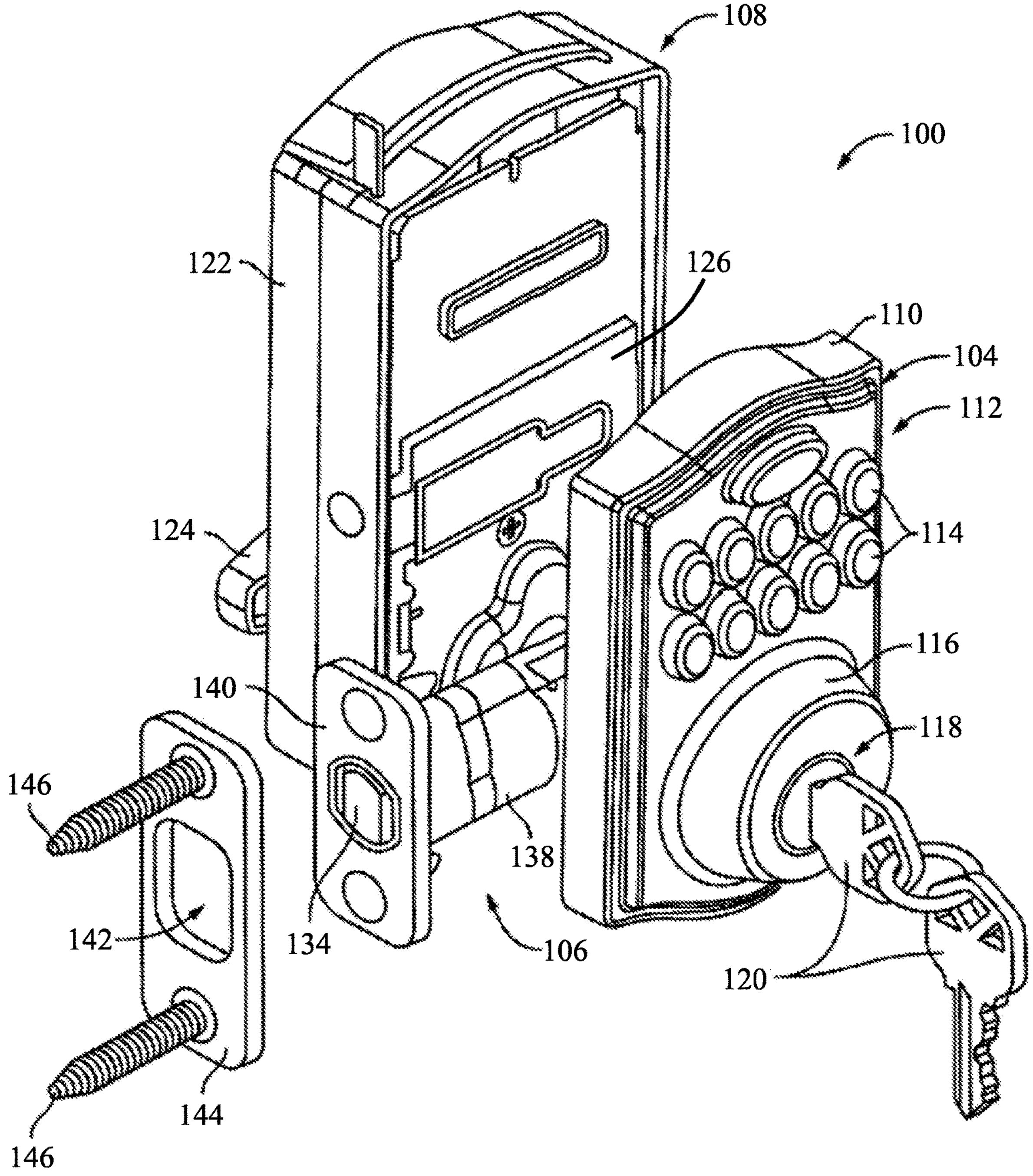
FIG. 1 is a perspective view of an exemplary electronic lock assembly.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one example," "an example," "an illustrative example," etc., indicate that the example described may include a particular feature, structure, or characteristic, but every example may or may not necessarily include that particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some examples, such features may be arranged in a different manner and/or order than shown in the illustrative figures. Additionally, the inclusion of a structural or method feature in a particular figure is not meant to imply that such feature is required in all examples and, in some examples, may not be included or may be combined with other features.

An electronic lock assembly is disclosed herein with enhanced electrical connection features. The electronic lock assembly has an exterior assembly and an interior assembly that both can selectively drive a latch assembly with a lock bolt. The exterior assembly and the interior assembly are electronically coupled to one another so that electronic power and/or signals can be transferred therebetween. This physical electronic coupling is provided by one or more wires with connectors at the end and that extend through a bore in the door. The wires from each of the exterior assembly and the interior assembly need to have a length that is long enough to facilitate connection of the assemblies during installation; however, once connected the connectors, stiffen and increase the length of the wires for storage. The bore in the door houses the mechanical driving components for the lock bolt, and thus, does not have enough space for the wire storage. As such, the interior assembly has a recess formed on its rear side that the connectors and wires can be stored within. The recess includes a connector holder clip for the interior connector that is pivotably mounted. By pivotably mounting the interior connector within the recess, the interior connector may be positioned in a first orientation that enables the installer to easily plug the two connectors together with the interior connector extending at least partially out of the recess. Once the connectors are connected, the connector holder clip can be pivoted towards a second orientation whereby the connectors are folded into the recess and so that a portion of the wires from the external assembly can easily be tucked within the recess prior to mounting the interior assembly on the door.

The term "lock" or "lockset" is broadly intended to include any type of lock, including, but not limited to, deadbolts, knob locks, lever handle locks, mortise locks, and slide locks, whether mechanical, electrical, or electro-mechanical locks. The locking points may have various mounting configurations and/or locations, including, but not limited to: mortised within the doorframe, mounted externally to the doorframe or support structure, and/or affixed directly to the door.

Figure 2:
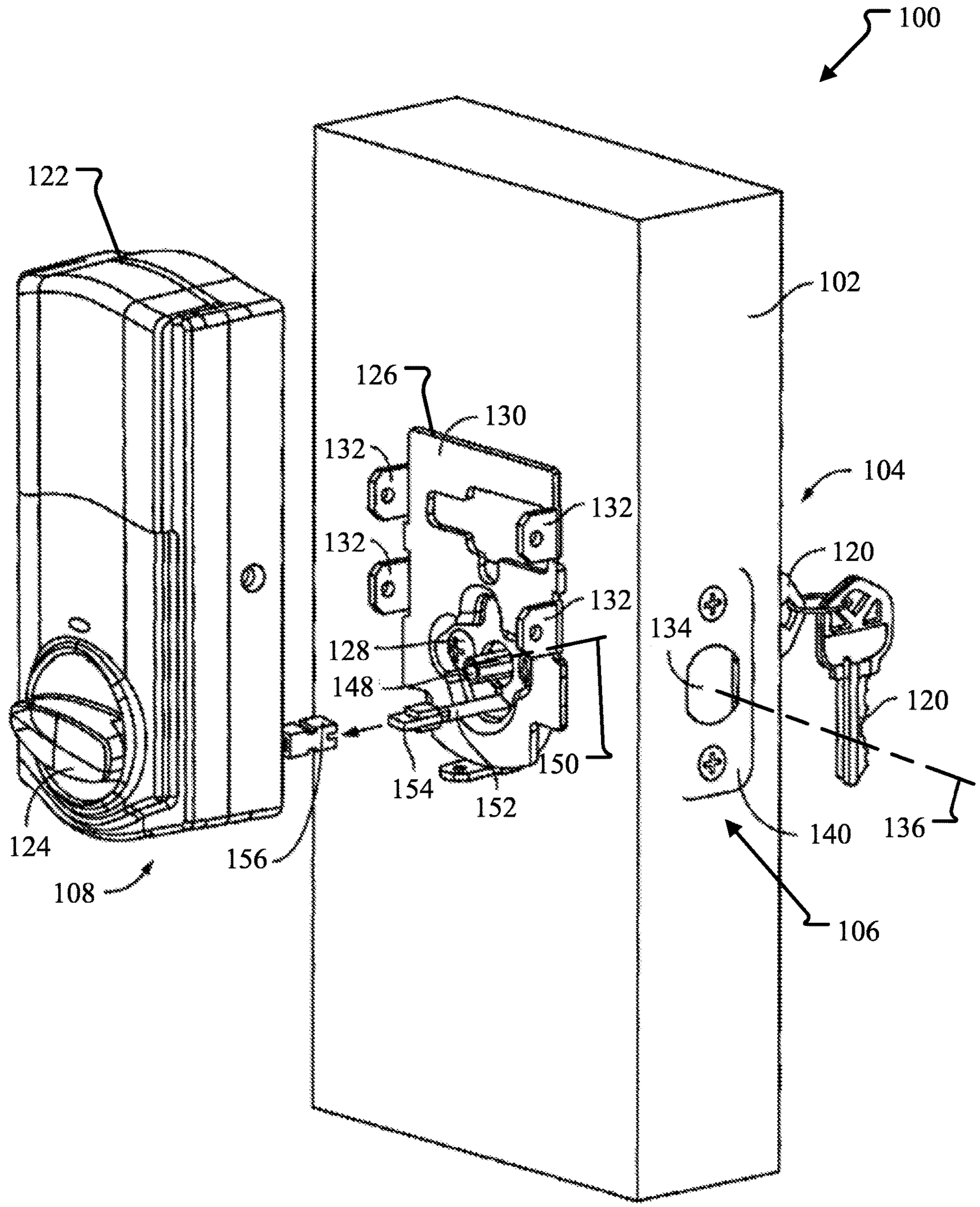
FIG. 2 is a perspective view of the electronic lock assembly shown in FIG. 1 during installation on a door.

FIG. 1 is a perspective view of an exemplary electronic lock assembly 100. FIG. 2 is a perspective view of the electronic lock assembly 100 during installation on a door 102. Referring concurrently to FIGS. 1 and 2, the electronic lock assembly 100 includes an exterior assembly 104, a latch assembly 106, and an interior assembly 108. Typically, the exterior assembly 104 is mounted on the outside of the door 102, while the interior assembly 108 is mounted inside the door 102. The latch assembly 106 is mounted in a bore formed in the door 102. The term "outside" is broadly used to mean an area outside the door 102 and "inside" is broadly used to denote an area inside the door 102. With an exterior entry door, for example, the exterior assembly 104 may be mounted outside a building, while the interior assembly 108 may be mounted inside the building. With an interior door, the exterior assembly 104 may be mounted inside a building, but outside a room secured by the electronic lock assembly 100, while the interior assembly 108 may be mounted inside the secured room. The electronic lock assembly 100 is applicable to both interior and exterior doors as required or desired.

In the example, the exterior assembly 104 has an exterior housing 110 that mounts to the exterior surface of the door 102 and houses the internal components of the exterior assembly 104. As illustrated, the exterior housing 110 has a decorative rectangular shape, but round, square, and other shapes for the exterior housing 110 can be utilized as required or desired. A keypad 112 with a plurality of buttons 114 is supported by the exterior housing 110. The keypad 112 is an input device and the buttons 114 may be used to enter a passcode for locking/unlocking the electronic lock assembly 100 or otherwise control operation thereof. Although a keypad 112 with buttons 114 is shown in this example, additionally or alternatively, other input devices may be supported by the exterior housing 110, such as, but not limited to, touch screen or other touch interfaces, biometric interface (e.g., a fingerprint sensor, retina, scanner, or camera including facial recognition), audio interface with voice recognition, and the like. A cylinder guard 116 extends from the exterior housing 110 to protect and reinforce a key cylinder 118. In the example, the cylinder guard 116 is integral with the exterior housing 110, but can be a separate component as required or desired. A physical key 120 may be inserted into the key cylinder 118 to mechanically lock/unlock the electronic lock assembly 100. Accordingly, the exterior assembly 104 may be used to lock/unlock the electronic lock assembly 100 either electronically using the keypad 112 or mechanically using the key 120. In some examples, a handle (not shown) may be supported on the exterior housing 110.

The interior assembly 108 has a cover 122 that mounts to the interior surface of the door 102 and houses internal components of the interior assembly 108 as described further below. A turn-piece 124 is supported on the interior assembly 108 and used to manually lock/unlock the electronic lock assembly 100 from the interior. A mounting plate 126 is mounted to the interior surface of the door 102 via one or more fasteners 128 and is configured to support the interior assembly 108 on the door 102. The mounting plate 126 includes a plate portion 130 and one or more tabs 132 for connecting the interior assembly 108 to the door 102.

The latch assembly 106 is mounted at least partially within an edge surface of the door 102 and is coupled to both the exterior assembly 104 and the interior assembly 108. The latch assembly 106 includes a bolt 134 that is movable between a locked (e.g., extended) and unlocked (e.g., retracted) position electronically and/or mechanically along a bolt axis 136. The bolt 134 moves linearly in and out of a sleeve 138. When the bolt 134 is retracted, an end of the bolt 134 is generally flush with a face plate 140. When the bolt 134 is extended, the bolt 134 protrudes through an edge bore in the door 102 into an opening 142 of a strike plate 144, which is positioned in a door jamb (not shown) adjacent the door 102. The strike plate 144 is attached to the jamb using fasteners 146.

The latch assembly 106 is mounted in the door 102 between the interior assembly 108 and the exterior assembly 104. A drive shaft 148 extends through a spindle drive (not shown) on the latch assembly 106 and couples to both the interior assembly 108 and the exterior assembly 104. The drive shaft 148 extends along and is rotatable around a shaft axis 150 to drive the movement of the bolt 134. The drive shaft 148 may be a single component or be formed from multiple components that transfer rotational movement there along as required or desired. In the example, the shaft axis 150 is orthogonal to the bolt axis 136. In operation, rotation of the drive shaft 148 in a first direction causes the bolt 134 to extend, and rotation of the drive shaft 148 in the opposing direction causes the bolt 134 to retract. Rotation of the drive shaft 148 may be induced by manual rotation of the turn-piece 124, mechanical rotation via the key cylinder 118, and/or electronically controlled with a motor (not shown) housed within the interior assembly 108 and responsive to input from the keypad 112 to extend/retract the bolt 134. In examples, the motor may be an electric motor that is powered by a power source housed within the interior assembly 108, such as, but not limited to, a battery pack.

In the example, the exterior assembly 104 is coupled in communication with the interior assembly 108. This coupling may allow electronic power and/or signals to be transmitted between the exterior assembly 104 and the interior assembly 108. The exterior assembly 104 includes a wiring harness 152 with an exterior connector 154 disposed on a free end. The wiring harness 152 enables the exterior connector 154 to extend from the exterior housing 110 and, for example, extend through a bore on the door 102 to reach towards the interior side and physically couple to a corresponding interior connector 156 of the interior assembly 108. In an aspect, the exterior connector 154 is a male connector, while the interior connector 156 is a female connector.

As such, to install the electronic lock assembly 100, the exterior connector 154 is passed through the door 102 and the connectors 154, 156 are physically and electrically connected to one another on the interior side of the door 102. Then, the interior assembly 108 is mounted to the door 102 and the wires and connectors are tucked between the interior assembly 108 and the door 102. However, when the connectors 154, 156 are coupled to one another, increased wear is generated on the wiring harness 152 because of how the interior assembly 108 needs to be positioned prior to mounting on the door 102. Additionally, once the connectors 154, 156 are coupled together, the wiring between the assemblies has a long and stiff section that makes it difficult to tuck within the small recess provided at the rear of the interior assembly 108. The space within the bore of the door 102 is limited, and as such, the wiring needs to be stored within the interior assembly 108. Accordingly, and as further described herein, a pivoting connector holder clip is provided on the interior assembly 108 so that during installation of the electronic lock assembly 100, the two connectors 154, 156 can be plugged straight in to each other and then folded back into the rear recess, thereby increasing performance of the electronic lock assembly 100 and the installation thereof.

Figure 3:
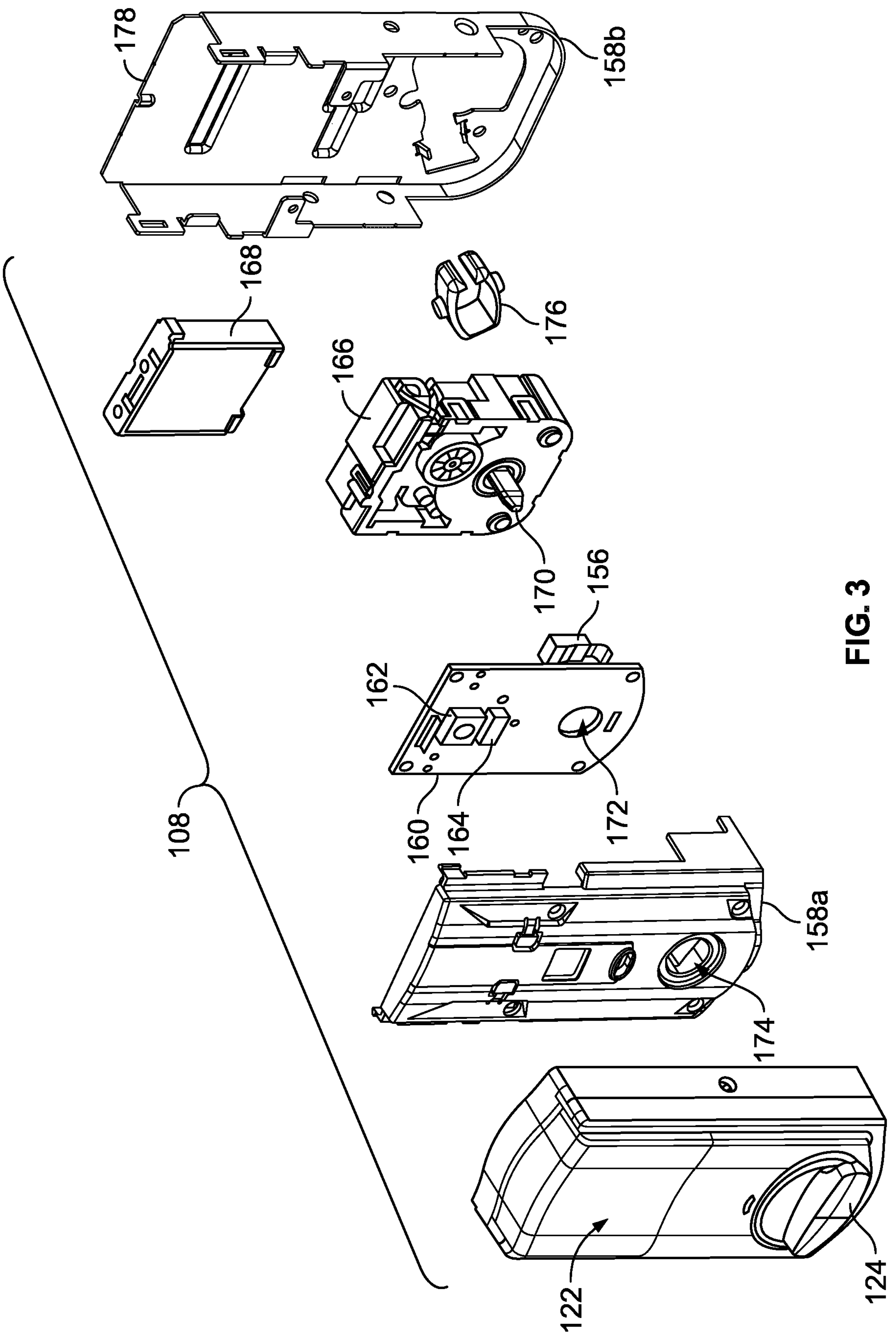
FIG. 3 is a perspective exploded view of an exemplary interior assembly of the electronic lock assembly shown in FIGS. 1 and 2.

FIG. 3 is a perspective exploded view of the interior assembly 108 of the electronic lock assembly 100 (shown in FIGS. 1 and 2). The interior assembly 108 includes an interior housing 158, which in this example, is formed from a board cover 158*a* and a back plate 158*b*. The cover 122 is configured to be attached over the interior housing 158 and supports the turn-piece 124. One or more printed circuit boards (PCB) 160 are supported by the board cover 158*a* and include memory and a processor (e.g., controller) that is configured to control the electronic lock assembly 100 as described herein. In aspects, the PCB 160 may include any number of components that enable operation of the electronic lock assembly 100, including, but not limited to, a programming button 162, a switch bank 164, an antenna (not shown), and the like. In the example, the PCB 160 is in communication with the interior connector 156 that is configured to be connected with the exterior connector 154 from the exterior assembly 104 (both shown in FIG. 2).

The interior housing 158 houses a gearbox housing 166 that holds, for example, the electronic motor, transmission gears, and drive shafts that enable the electronic lock assembly 100 to be operated electronically. The gearbox housing 166 may also support a clutching mechanism, magnets for sensing position, and other components as required or desired. The gearbox housing 166 is coupled to the PCB 160 for operational control. A battery holder assembly 168 is configured to hold a plurality of batteries for providing electrical power to the electronic components within the electronic lock assembly 100 and is also disposed within the interior housing 158. A shaft 170 extends from the gearbox housing 166 that couples to the turn-piece 124 so that rotation of the turn-piece 124 rotates the shaft 170. The shaft 170 extends through corresponding openings 172, 174 within the PCB 160 and the board cover 158*a*.

In the example, a connector holder clip 176 is pivotably coupled to the gearbox housing 166 and accessible via a rear wall 178 of the back plate 158*b*. The connector holder clip 176 is shaped and sized to pivotably support the interior connector 156 on the interior assembly 108 to increase installation performance and efficiencies of the electronic lock assembly 100. The connector holder clip 176 is described further below in reference to FIGS. 4-6.

Figure 4:
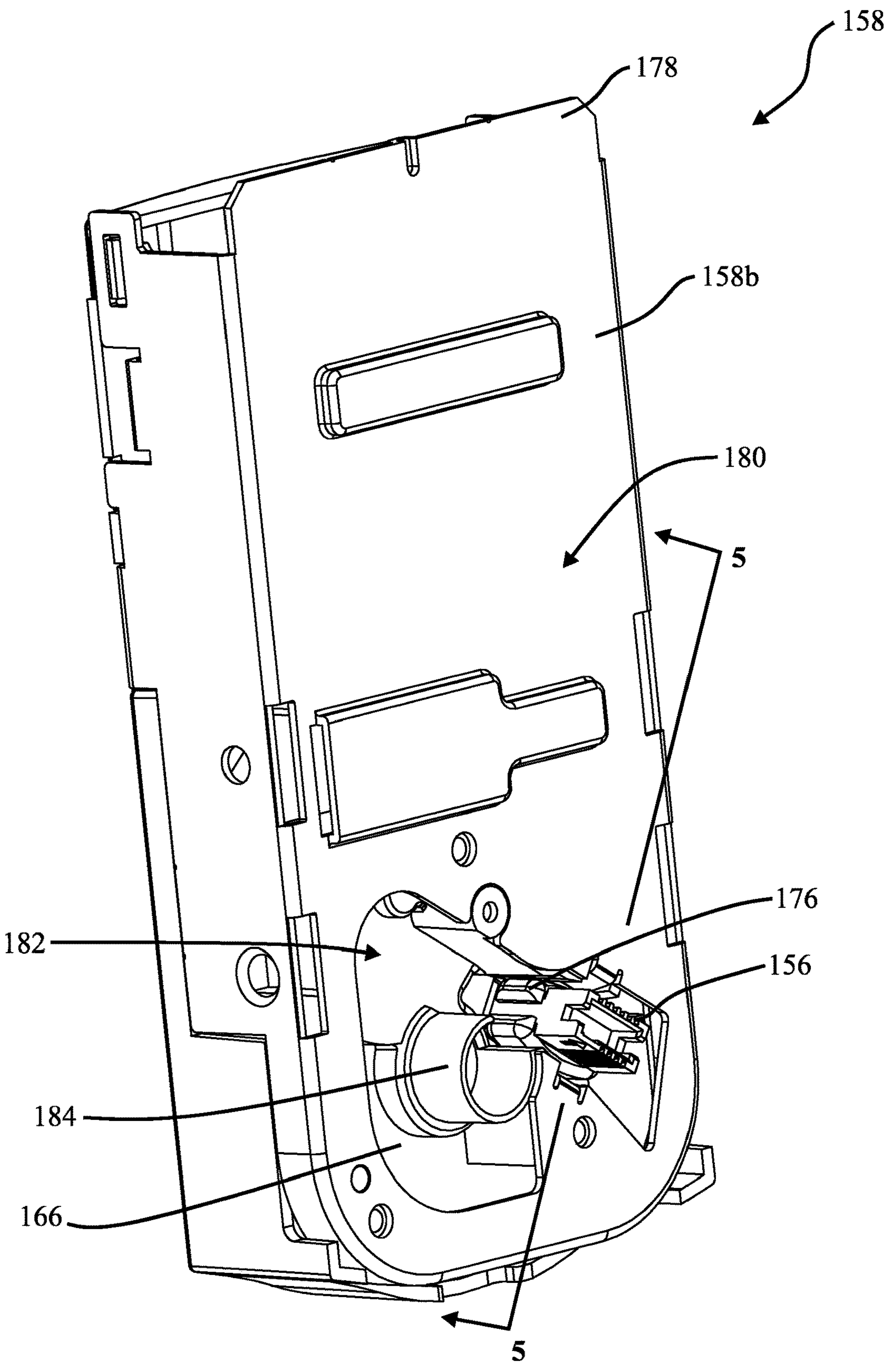
FIG. 4 is a rear perspective view of an exemplary interior housing of the interior assembly shown in FIG. 3.

FIG. 4 is a rear perspective view of the interior housing 158 of the interior assembly 108 (shown in FIG. 3). The rear wall 178 of the back plate 158*b* forms a rear surface 180 of the interior housing 158 that is configured to face the door 102 (shown in FIG. 2) when mounted thereto. A recess 182 is formed within the rear surface 180 and forms the cavity which receives at least a portion of the exterior connector 154 and wiring harness 152 when the exterior assembly 104 (all shown in FIG. 2) is coupled to the interior connector 156. In an aspect, the recess 182 may be formed from an opening within the rear wall 178 and side and bottom walls formed by the gearbox housing 166. The gearbox housing 166 also includes a tube 184 disposed within the recess 182 and extending outward therefrom. The tube 184 is configured to support an internal driver (not shown) so that the drive shaft 148 from the exterior assembly 104 (shown in FIG. 2) can rotatably engage with the shaft 170 coupled to the turn-piece 124 (shown in FIG. 3) and enable both the interior assembly 108 and the exterior assembly 104 to drive operation of the latch assembly 106 (shown in FIG. 1) as described herein.

The connector holder clip 176 is disposed at least partially within the recess 182 and pivotably supports the interior connector 156. In the example, the connector holder clip 176 is configured to pivotably move or swivel between at least two positions. A first position is illustrated in FIG. 4, whereby the interior connector 156 extends outward from the rear surface 180 of the interior housing 158 and is in a position to more easily receive the exterior connector 154. A second position (not shown) pivots or swivels the interior connector 156 into the recess 182 so that the connector assembly (e.g., the connected connectors 154, 156) is positioned tangent to the tube 184, and the wiring harness 152 from the exterior assembly 104 can be more easily tucked at least partially into the recess 182 and around the tube 184.

Figure 5:
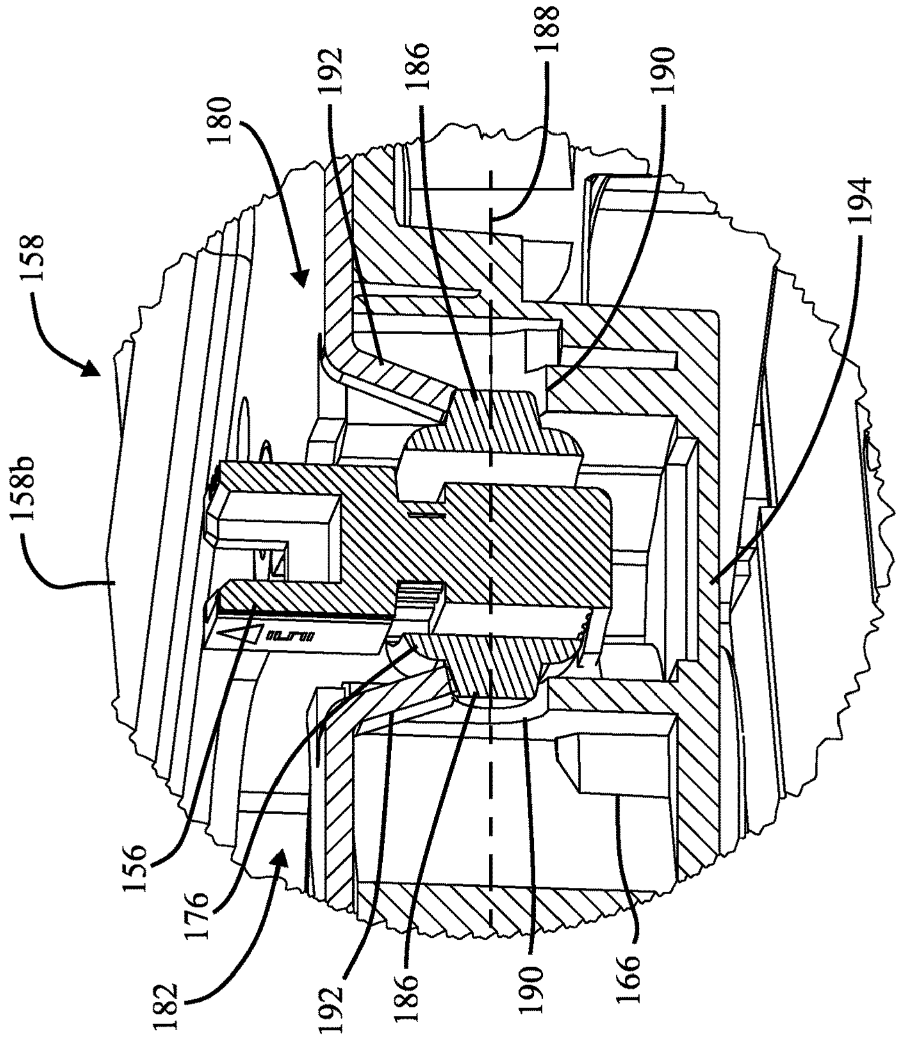
FIG. 5 is a partial cross-sectional view of the interior housing shown in FIG. 4 and taken along line 5-5.

FIG. 5 is a partial cross-sectional view of the interior housing 158 shown in FIG. 4 and taken along line 5-5. The connector holder clip 176 includes opposing pivot pins 186 that define a pivot axis 188 for the interior connector 156. In the example, the pivot axis 188 is parallel to and inwardly offset from a plane defined by the rear surface 180 of the back plate 158*b*. In an aspect, the pivot axis 188 is orthogonal to the shaft axis 150 of the drive shaft 148 (both shown in FIG. 2) that couples to the gearbox housing 166 so that the shaft 148 is selectively rotatable. The pivot axis 188 is also different than the bolt axis 136 of the bolt 134 (both shown in FIG. 2). This orientation of the connector holder clip 176 enables the interior connector 156 to be movable, via the pivoting operation of the connector holder clip 176 around the pivot axis 188, between at least a first position as illustrated in FIG. 5 whereby the interior connector 156 extends from the interior housing 158 and is parallel to the shaft axis 150 for ease of attaching the exterior connector 154 (shown in FIG. 2) and a different second position (not shown). In an aspect, the second position of the connector 156 is about 90° from the first position and such that the interior connector 156 is pivoted and retracted into the recess 182 so that the electrical wiring of the electronic lock assembly can be more easily tucked therein.

In the example, the gearbox housing 166 defines a pair of pivot pin receivers 190 that enable the pivot pins 186 of the connector holder clip 176 to be received therein and the connector holder clip 176 to pivot relative to the interior housing 158. In an aspect, the receivers 190 are curved surfaces defined in opposing sidewalls so that the connector holder clip 176 can be dropped into position within the interior housing 158 and allow the connector holder clip 176 to rotate. The back plate 158*b* can include inwardly extending arms 192 that secure the pivot pins 186 of the connector holder clip 176 within the pivot pin receivers 190. In the example, the connector holder clip 176 can be attached to the interior connector 156 and then the assembly is pivotably mounted to the gearbox housing 166 and secured with the back plate 158*b*. When the connector holder clip 176 is pivotably coupled to the interior housing 158, the connector holder clip 176 is raised relative to a bottom wall 194 of the recess 182 so that it can swivel around the pivot axis 188. As such, when the interior connector 156 is supported by the connector holder clip 176, the connector 156 is also raised relative to the bottom wall 194. This spacing allows for electronic wires to extend from one end of the interior connector 156 while still allowing the connector 156 to pivot between different positions as described herein.

Figure 6:
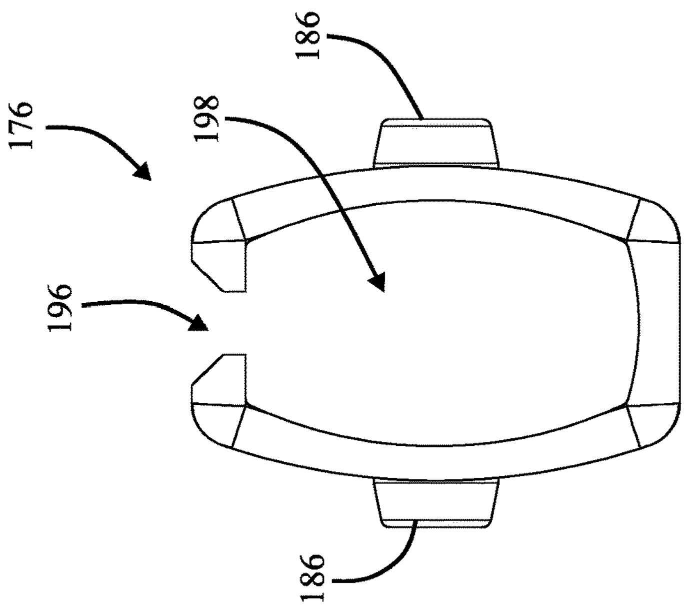
FIG. 6 is a top view of an exemplary connector holder clip of the interior housing shown in FIGS. 4 and 5.

FIG. 6 is a top view of the connector holder clip 176 of the interior housing 158 (shown in FIGS. 4 and 5). The connector holder clip 176 has a substantially U-shaped body with a slit 196 at one end. The slit 196 enables the body to spread apart and couple to the interior connector 156 (shown in FIG. 5). The U-shaped body also has a through opening 198 that receives at least a portion of the interior connector 156 so that one end of the connector 156 is free to connect to the exterior connector 154 (shown in FIG. 2) and the other end of the connector 156 is free to have wires extending therefrom while allowing the connector 156 to pivot via the pivot pins 186.

The opening 198 is substantially rectangular in shape to correspond to the shape and size of the interior connector 156. As illustrated, the pivot pins 186 are positioned on the major sides of the holder clip 176 while the slit 196 is on a minor side. The pivot pins 186 are disposed at a midpoint of the major sides so that the connector holder clip 176 can be pivotably coupled within the interior housing top-up, or top-down as required or desired. It should be appreciated that the connector holder clip 176 can take on any form that corresponds to the connector 156 and that enables the function of the holder clip 176 as described herein.

Figure 7:
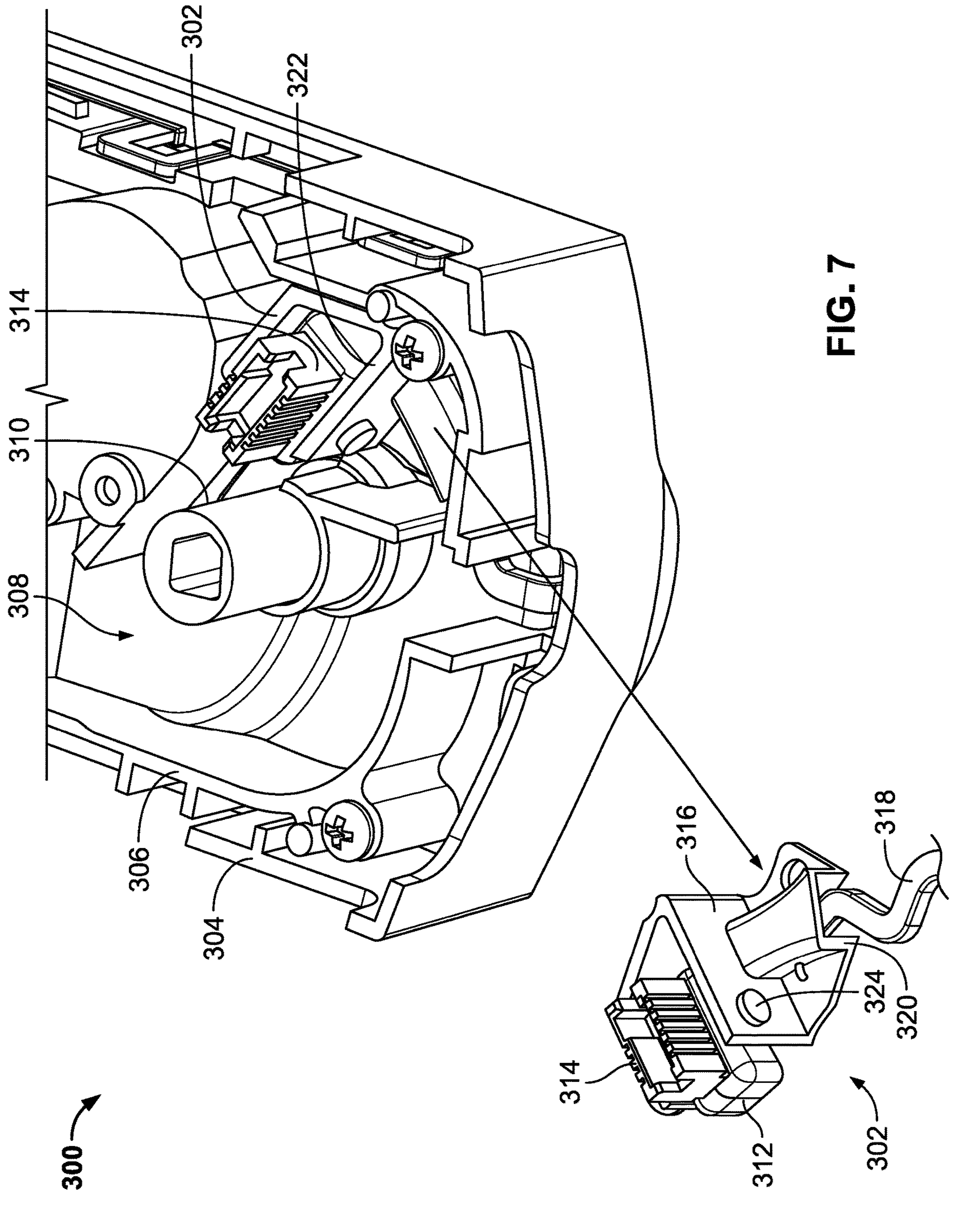
FIG. 7 is an interior partial perspective view of an interior housing having another connector holder clip in a first position.

FIG. 7 is an interior partial perspective view of an interior housing 300 having another connector holder clip 302 in a first position. The interior housing 300, similar to the example described above, includes a board cover 304 and a gearbox housing 306, however, the back plate is not illustrated for clarity. A recess 308 is defined within the interior housing 300 so that a wire cavity is formed. The gearbox housing 306 supports an interior driver 310 so that the drive shaft 148 from the exterior assembly 104 (both shown in FIG. 2) can be coupled to the interior housing 300 to enable operation of the electronic lock assembly as described herein. In this example, the connector holder clip 302 includes a clip member 312 for an interior connector 314 and a base member 316 that couples to a bottom wall of the recess 308. The interior connector 314 is connected to the printed circuit board via one or more wires 318.

The base member 316 of the connector holder clip 302 includes a channel 320 that receives and protects at least a portion of the wires 318 and sidewalls 322 that pivotably support the clip member 312. The base member 316 attaches directly to the recess 308, and for example, directly on a bottom wall that is formed by the gearbox housing 306. The connector holder clip 302 extends at least partially around the interior driver 310 so there is no interference with operation of the lock bolt. The clip member 312 includes pivot pins 324 so that the clip member 312, and thus the interior connector 314, can pivot or swivel around a pivot axis. The clip member 312 is shaped and sized to receive the interior connector 314 and pivot within the recess 308.

Figure 8:
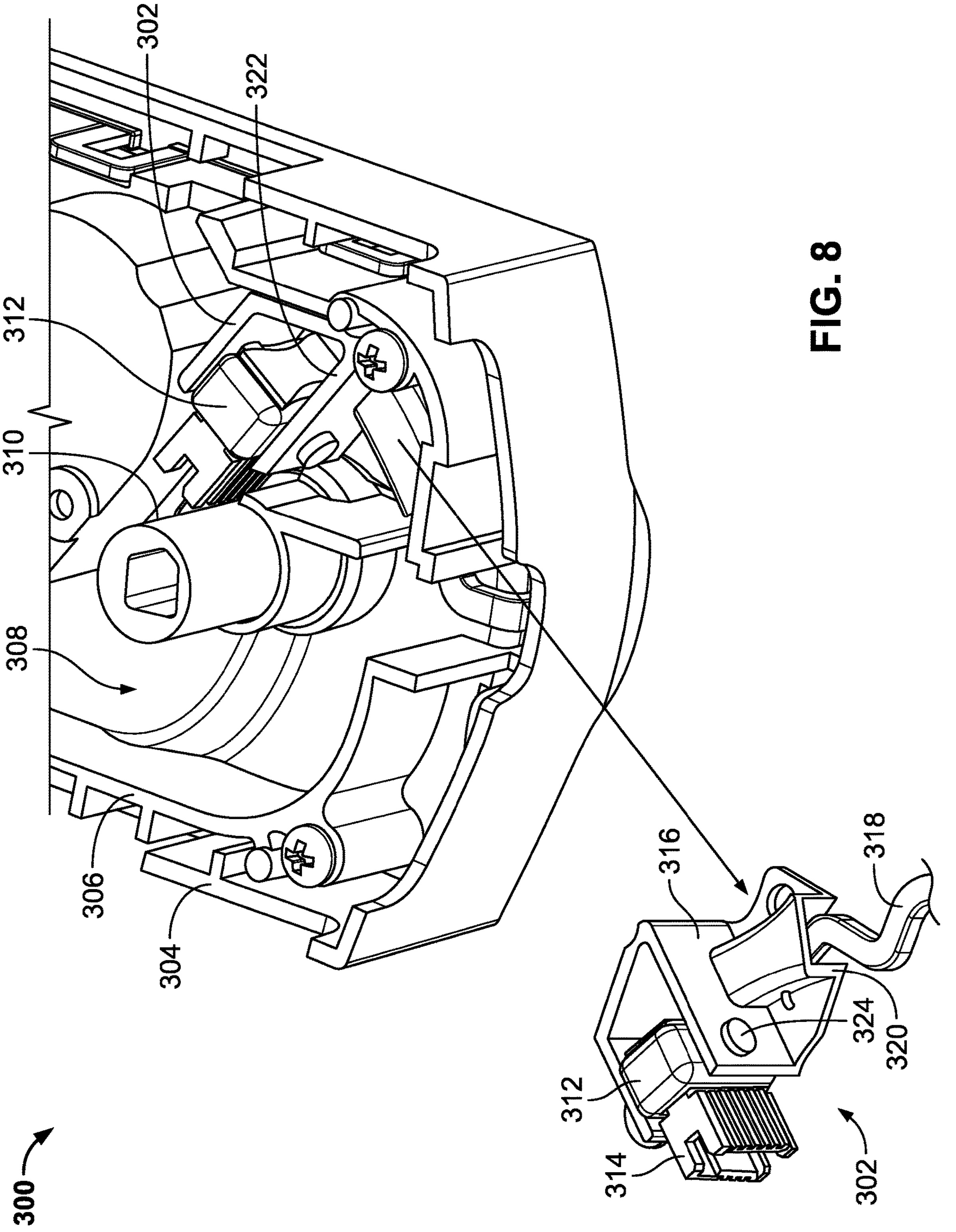
FIG. 8 is an interior partial perspective view of the interior housing of FIG. 7 with the connector holder clip in a second position.

FIG. 8 is an interior partial perspective view of the interior housing 300 with the connector holder clip 302 in a second position. Certain components are described above, and thus, not necessarily described further. As illustrated in FIG. 8, the connector holder clip 302 and the interior connector 314 are pivoted from the first position illustrated in FIG. 7 and retracted within the recess 308. This position of the interior connector 314 enables for the corresponding exterior connector and wiring harness to be tucked into the recess 308 more easily by the installer. In an aspect, the interior connector 314 is oriented tangential to the interior driver 310 so as to increase the compactness of the interior housing 300. In an aspect, the second position of the interior connector 314 may be about 90° from the first position around the pivot axis of the clip member 312.

Figure 9:
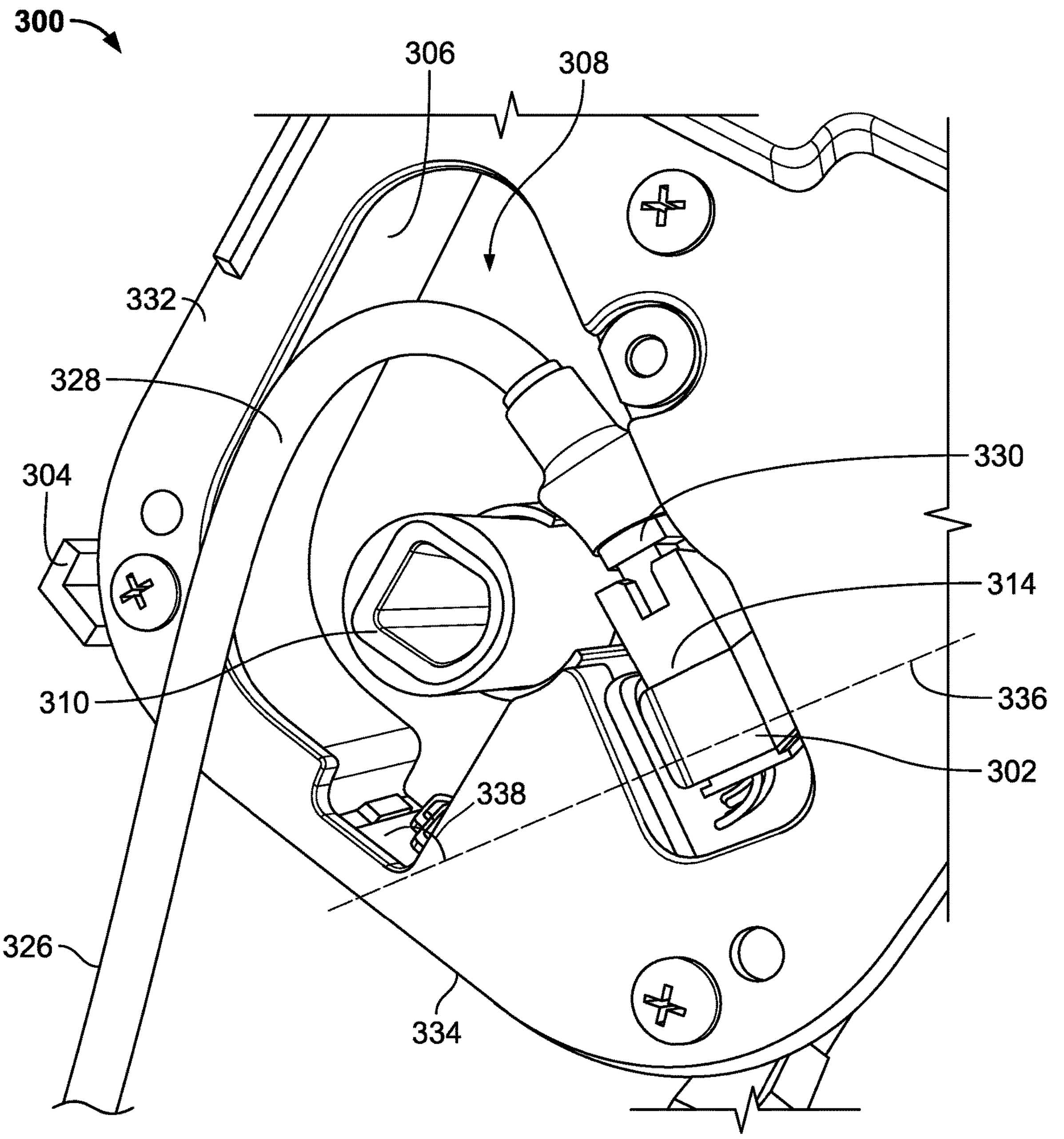
FIG. 9 is a perspective view of the interior housing shown in FIG. 8 with an exterior assembly connected.

FIG. 9 is a perspective view of the interior housing 300 with an exterior assembly 326 connected. The exterior assembly 326 is shown by a wiring harness 328 and an exterior connector 330. Additionally, the interior housing 300 includes a back plate 332 attached to the gearbox housing 306 and the board cover 304. As illustrated in FIG. 9, the connector holder clip 302 is in the second position such that the connectors 330, 314 are disposed within the recess 308 and the wiring harness 328 wraps at least partially around the interior driver 310. In an aspect, when the connector holder clip 302 is in the second position, the wiring harness 328 extends at least 180° around the interior driver 310. The portion of the wiring harness 328 that is not disposed within the recess 308 is configured to extend through the bore on the door and adjacent the drive shaft as described above. By wrapping at least a portion of the wiring harness 328 around the interior driver 310, the extended length of the wiring harness 328 can be maintained so as to increase the ease of connecting the connectors 330, 314. Additionally, the connector holder clip 302 facilitates positioning the connectors 330, 314 completely within the recess 308 so that the interior housing 300 is easier to mount to the door.

In the example, the interior housing 300 includes a bottom wall 334 and a pivot axis 336 of the connector holder clip 302 intersects the bottom wall 334 at an oblique angle 338. This orientation of the connector holder clip 302 facilitates wire location control for both connectors 330, 314 while reducing the size required for the recess 308 within the interior housing 300.

Figure 10:
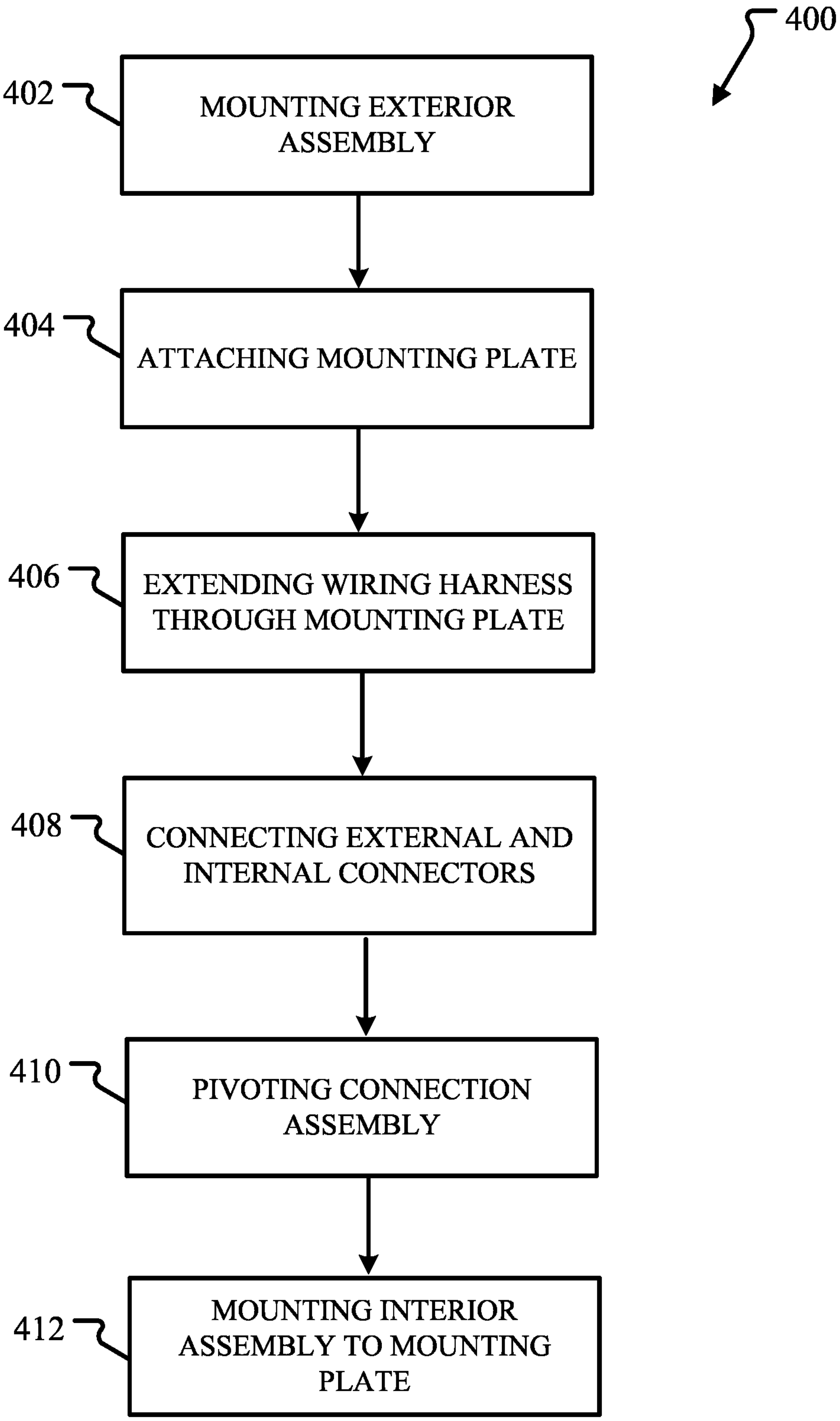
FIG. 10 illustrates a flowchart depicting a method of installing an electronic lock assembly on a door.

FIG. 10 illustrates a flowchart depicting a method 400 of installing an electronic lock assembly on a door. The example methods and operations can be implemented or performed by the assemblies described herein (e.g., the electronic lock assembly 100 and interior housings 158, 300 shown in FIGS. 1-9). The method 400 beings with mounting an exterior assembly on an exterior surface of the door (operation 402). The exterior assembly has a wiring harness with an exterior connector extending from the exterior assembly configured to extend through a bore on the door. In an aspect, the wiring harness is configured to transmit electrical signals and receive electrical power therethrough. On an interior surface of the door and opposite at least a portion of the exterior assembly, a mounting plate is attached to the door (operation 404).

At least a portion of the wiring harness and the exterior connector is extended through the bore of the door and the mounting plate (operation 406). Once the exterior connector is disposed on the interior side of the door, the external connector is physically connected to a corresponding interior connector accessible from a rear of an interior assembly (operation 408). The interior connector is pivotably supported by a connector holder clip on the interior assembly and is in a first position relative to the interior assembly. In an aspect, the first position of the connector holder clip orients the interior connector orthogonal to the rear of the interior assembly for receipt of the exterior connector.

The connector assembly of the interior and exterior connectors are then pivoted (operation 410) via the connector holder clip to a different second position within the interior assembly such that at least a portion of the wiring harness is tucked within a recess defined in the rear of the interior assembly. In an aspect, the connector holder clip is disposed within the recess and the second position of the connector holder clip orients the interior connector parallel to the rear of the interior assembly. Once the wiring harness and connectors are tucked within the recess, the interior assembly can be more easily mounted to the mounting plate (operation 412). Additionally, this installation procedure reduces wear on the wiring harness and connectors during the connection and mounting steps.

In some examples, the method 400 may further include attaching the interior connector to the connector holder clip and then pivotably mounting the connector holder clip within the recess of the interior assembly. By pivotably mounting the interior connector to the rear of the interior assembly, the installer is able to more easily physically plug in the exterior connector in an axial direction that is orthogonal to the rear of the interior assembly and then fold the connectors back into the recess without having to struggle to tuck the longer two connector assemblies within the recess. Accordingly, the electronic lock assembly described herein has increased installation performance and decreased wear on the electronic connection components.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. An electronic lock assembly comprising:

a latch assembly with a bolt movable between an extended position and a retracted position along a first axis;

a drive shaft extending along a second axis and coupled to the latch assembly, the drive shaft selectively rotatable around the second axis to drive the movement of the bolt, wherein the first axis is orthogonal to the second axis;

a first assembly including a wiring harness having a first connector extending therefrom; and a second assembly coupled to the drive shaft and including a second connector configured to receive the first connector such that the first assembly and the second assembly are coupled in communication, the second assembly including:

a housing having a surface configured to face a door when the housing is mounted to the door, wherein a recess is defined within the surface; and a connector holder clip pivotably supporting the second connector and disposed at least partially within the recess, wherein the connector holder clip defines a through opening that receives at least a portion of the second connector such that one end of the second connector is free to connect to the first connector and an opposite end of the second connector has wires extending to a printed circuit board disposed within the second assembly, the second connector being movable between at least a first position whereby the second connector is parallel to the second axis and a different second position.

2. The electronic lock assembly of claim 1, wherein the second position is about 90° from the first position.

3. The electronic lock assembly of claim 1, wherein the second assembly further includes a gearbox housing, the connector holder clip pivotably coupled to the gearbox housing.

4. The electronic lock assembly of claim 1, wherein the connector holder clip pivots around a third axis, the third axis being different than both of the first axis and the second axis.

5. The electronic lock assembly of claim 4, wherein the third axis is parallel to a plane defined by the surface of the housing.

6. The electronic lock assembly of claim 4, wherein the housing has a bottom wall, and wherein the third axis intersects the bottom wall at an oblique angle.

7. The electronic lock assembly of claim 1, wherein when the second connector is in the second position and the wiring harness is coupled thereto, the wiring harness extends at least 180° around the drive shaft within the recess.

8. The electronic lock assembly of claim 1, wherein the connector holder clip includes a base member coupled within the recess and a clip member for the second connector pivotably coupled to the base member.

9. The electronic lock assembly of claim 1, wherein the connector holder clip has a substantially U-shaped body with a slit at one end.

10. An interior assembly for an electronic lock assembly comprising:

a housing having a surface configured to face a door when the housing is mounted to the door, wherein a recess is defined within the surface;

a gearbox housing disposed at least partially within the housing;

a shaft at least partially extending from the gearbox housing and defining a first axis, the shaft drivingly coupled to the gearbox housing such that the shaft is selectively rotatable around the first axis;

at least one printed circuit board disposed within the housing, wherein an interior connector is coupled in communication with the at least one printed circuit board and configured to receive an exterior connector extending from an exterior assembly of the electronic lock assembly; and a connector holder clip disposed at least partially within the recess and pivotably supporting the interior connector, wherein the connector holder clip is pivotable around a second axis, the second axis being parallel to a plane defined by the surface of the housing and orthogonal to the first axis, wherein one or more wires extend between the at least one printed circuit board and the interior connector, and wherein the interior connector via the connector holder clip is pivotable around the second axis between at least two positions.

11. The interior assembly of claim 10, wherein a first position of the interior connector extends at least a portion of the interior connector out of the recess and a second position of the interior connector retracts the interior connector within the recess.

12. The interior assembly of claim 10, wherein the connector holder clip defines a through opening to receive the interior connector with the one or more wires extending from one end.

13. The interior assembly of claim 10, wherein the connector holder clip is pivotably coupled to the gearbox housing via a pair of pivot pins.

14. The interior assembly of claim 13, wherein the gearbox housing defines a pair of pivot pin receivers.

15. The interior assembly of claim 13, wherein the housing includes a back plate that secures the connector holder clip to the gearbox housing.

16. The interior assembly of claim 13, wherein the connector holder clip is raised relative to a bottom wall of the recess.

17. The interior assembly of claim 13, wherein the connector holder clip is pivotable around the second axis at least 90°.

18. A method of installing an electronic lock assembly on a door, the method comprising:

mounting an exterior assembly on an exterior surface of the door, wherein a wiring harness having an exterior connector extends from the exterior assembly and extends through a bore on the door;

attaching a mounting plate to an interior surface of the door opposite at least a portion of the exterior assembly;

extending at least a portion of the wiring harness through the mounting plate;

connecting the exterior connector to a corresponding interior connector accessible from a rear of an interior assembly, wherein the interior connector is pivotably supported by a connector holder clip and is in a first position relative to the interior assembly, and wherein the connector holder clip defines a through opening that receives at least a portion of the interior connector such that one end of the interior connector is free to connect to the exterior connector and an opposite end of the interior connector has wires extending to a printed circuit board disposed within the interior assembly;

pivoting the interior connector via the connector holder clip to a different second position within the interior assembly such that at least a portion of the wiring harness is tucked within a recess defined in the rear of the interior assembly; and mounting the interior assembly to the mounting plate.

19. The method of claim 18, wherein the first position of the connector holder clip orients the interior connector orthogonal to the rear of the interior assembly for receipt of the exterior connector, and the second position of the connector holder clip orients the interior connector parallel to the rear of the interior assembly.

* * * * *